US010043016B2

(12) United States Patent
Wood et al.

(10) Patent No.: US 10,043,016 B2
(45) Date of Patent: Aug. 7, 2018

(54) METHOD AND SYSTEM FOR NAME ENCRYPTION AGREEMENT IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 15/056,904

(22) Filed: Feb. 29, 2016

(65) Prior Publication Data

US 2017/0249468 A1 Aug. 31, 2017

(51) Int. Cl.
*H04L 29/06* (2006.01)
*G06F 21/60* (2013.01)
(Continued)

(52) U.S. Cl.
CPC .......... *G06F 21/602* (2013.01); *G06F 21/645* (2013.01); *H04L 61/3055* (2013.01);
(Continued)

(58) Field of Classification Search
CPC ...... G06F 21/60; G06F 21/602; G06F 21/645; G06F 21/6227; H04L 61/3055;
(Continued)

(56) References Cited

U.S. PATENT DOCUMENTS 817,441 A 4/1906 Niesz
4,309,569 A 1/1982 Merkle
(Continued)

FOREIGN PATENT DOCUMENTS

CN 103873371 6/2014
DE 1720277 A1 6/1967
(Continued)

OTHER PUBLICATIONS

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
(Continued)

*Primary Examiner* — Hosuk Song

(57) ABSTRACT

One embodiment provides a system that facilitates efficient name encryption in a CCN. During operation, the system determines, by a client computing device, an index for a name of an interest, wherein the name is a hierarchically structured variable length identifier that includes contiguous name components ordered from a most general level to a most specific level, wherein the index indicates a minimum number of the contiguous name components beginning from the most general level that represent a minimum routable prefix needed to route the interest to a content producing device that can satisfy the interest. The system encrypts one or more name components of the interest name beginning with the name component immediately following the minimum routable prefix. The system transmits the interest based on the encrypted name, thereby facilitating efficient name encryption in a CCN.

20 Claims, 12 Drawing Sheets

(51) Int. Cl.
*G06F 21/64* (2013.01)
*H04L 29/08* (2006.01)
*H04L 29/12* (2006.01)
*H04W 12/02* (2009.01)

(52) U.S. Cl.
CPC ...... *H04L 63/0428* (2013.01); *H04L 67/1097* (2013.01); *H04L 67/327* (2013.01); *H04W 12/02* (2013.01)

(58) Field of Classification Search
CPC ............. H04L 63/0428; H04L 67/1097; H04L 67/327; H04W 12/02
USPC .......................................... 713/164–167, 189
See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,620,975 B2 * | 11/2009 | Guichard ................ H04L 45/00 380/200 |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,916,739 B2 * | 3/2011 | Trostle ............ H04L 29/12009 370/401 |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,661,263 B2 * | 2/2014 | Mattsson ............ G06F 21/6209 713/189 |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |

(56) References Cited

U.S. PATENT DOCUMENTS

| | | |
|---|---|---|
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,531,679 B2 * | 12/2016 | Uzun ............... H04L 63/0428 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |

(56) References Cited

U.S. PATENT DOCUMENTS

| | | |
|---|---|---|
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | ZoltÃ?Âin RichÃ?Âird |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |

(56) References Cited

U.S. PATENT DOCUMENTS

| | | |
|---|---|---|
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1* | 9/2014 | Zhang .................. H04L 9/3268 713/158 |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0222424 A1 | 8/2015 | Mosko et al. |
| 2015/0279348 A1 | 10/2015 | Cao |

(56) References Cited

U.S. PATENT DOCUMENTS

| | | |
|---|---|---|
| 2015/0288755 A1 | 10/2015 | Mosko |
| 2015/0312300 A1 | 10/2015 | Mosko |
| 2015/0349961 A1 | 12/2015 | Mosko |
| 2015/0358436 A1 | 12/2015 | Kim et al. |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavin Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Baugher, Mark et al., "Self-Verifying Names for Read-Only Named Data", 2012 IEEE Conference on Computer Communications Workshops (Infocom Wkshps), Mar. 2012, pp. 274-279.
Gasti, Paolo et al., 'DoS & DDoS in Named Data Networking', 2013 22nd International Conference on Computer Communications and Networks (ICCCN), Aug. 2013, pp. 1-7.
Zhang, et al., "Named Data Networking (NDN) Project", http://www.parc.com/ publication/2709/named-data-networking-ndn-project.html, Oct. 2010, NDN-0001, PARC Tech Report.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library—Pairing-Based Cryptography—About," http://crypto.stanford.edu/pbc.downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

(56) References Cited

OTHER PUBLICATIONS

J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer ScienceVolume 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—Africacrypt 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network &oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub Internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: A content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information—centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

(56) References Cited

OTHER PUBLICATIONS

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012}.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in Icn: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "Easier: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

(56) References Cited

OTHER PUBLICATIONS

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Internatonal Search Report and Written Opinion in corresponding International Application No. PCT/US2017/019755, dated Jul. 11, 2017, 15 pages.

* cited by examiner

METHOD AND SYSTEM FOR NAME ENCRYPTION AGREEMENT IN A CONTENT CENTRIC NETWORK

RELATED APPLICATIONS

The subject matter of this application is related to the subject matter in the following applications:

- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and
- U.S. patent application Ser. No. 14/947,810, entitled "TRANSPARENT ENCRYPTION IN A CONTENT CENTRIC NETWORK," by inventor Christopher A. Wood, filed 20 Nov. 2015 (hereinafter "U.S. patent application Ser. No. 14/947,810");

the disclosures of which are herein incorporated by reference in their entirety.

BACKGROUND

Field

This disclosure is generally related to distribution of digital content. More specifically, this disclosure is related to a method and system for name encryption agreement which allows a consumer to determine an index in a CCN name at which to begin encryption, based on a minimum routable prefix necessary for the interest to reach a producer in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A CCN data packet (such as an interest or content object) is routed based on its name. Some name components may be used by an intermediate node to route a CCN interest, while other name components may be used by a content producer to satisfy a request based on private user information or application-specific data. In the latter case, the meaningfulness of the name components may reveal information regarding the requested content and may result in a breach of user privacy or security. A consumer may encrypt the interest name, but a sufficient number of name components must remain unencrypted for routing purposes. This "minimum routable prefix" is the maximal name length (e.g., maximum number of name components) needed to route an interest to a content producer who can satisfy the content request.

While a CCN brings many desired features to a network, some issues remain unsolved for a consumer in determining the minimum routable prefix for an interest name.

SUMMARY

One embodiment provides a system that facilitates efficient name encryption in a CCN. During operation, the system determines, by a client computing device, an index for a name of an interest, wherein the name is a hierarchically structured variable length identifier that includes contiguous name components ordered from a most general level to a most specific level, wherein the index indicates a minimum number of the contiguous name components beginning from the most general level that represent a minimum routable prefix needed to route the interest to a content producing device that can satisfy the interest. The system encrypts one or more name components of the interest name beginning with the name component immediately following the minimum routable prefix. The system transmits the interest based on the encrypted name, thereby facilitating efficient name encryption in a CCN.

In some embodiments, the system generates a first probing interest with a name that comprises one or more contiguous name components of the interest name beginning from the most general level. In response to receiving a first content object which indicates a positive response of the first probing interest, the system sets the index to a number of name components in the first probing interest name. In response to receiving a second content object which indicates a negative acknowledgment of the first probing interest, the system generates a second probing interest with a name that comprises the first probing interest name followed by a next contiguous name component of the interest name.

In some embodiments, the system determines that the first content object indicates a positive response of the first probing interest. The system determines that the first content object indicates that a receiving content producing device can return a content object based on the name components of the interest name as included in the first probing interest name. The system also determines that a key identifier of the first content object matches a public key of the content producing device.

In some embodiments, the system appends a first random nonce to the first probing interest name. The system also appends a second random nonce to the second probing interest name.

In some embodiments, the system determines a midpoint index of a number of name components in the interest name, wherein a lower portion of the interest name includes the name components from the most general level name component to the name component preceding the name component corresponding to the midpoint index, and wherein an upper portion of the interest name includes the name components from the name component following the name component corresponding to the midpoint index to the most specific level name component. The system generates a first probing interest with a name that comprises one or more contiguous name components of the interest name beginning from the most general level name component to the name component corresponding to the midpoint index. In response to receiving a first content object which indicates a positive response of the first probing interest, the system sets the index to a number of name components in the first probing interest name.

In some embodiments, in response to receiving a second content object which indicates that a receiving content producing device can return a content object based on the name components of the interest name as included in the first probing interest, and in response to determining that a key identifier of the second content object is associated with a public key of the content producing device, the system determines a lower midpoint index of the lower portion. The system generates a second probing interest with a name that comprises one or more contiguous name components of the interest name beginning from the most general level name component to a name component corresponding to the lower midpoint index. In response to receiving a third content object which indicates a negative acknowledgment of the first probing interest, the system determines an upper midpoint index of the upper portion, and generates a third probing interest with a name that comprises one or more contiguous name components of the interest name beginning from the most general level name component to a name component corresponding to the upper midpoint index.

In some embodiments, the system appends a first random nonce to the first probing interest name, appends a second random nonce to the second probing interest name, and appends a third random nonce to the third probing interest name.

In some embodiments, the system generates one or more probing interests based on a number of number components for the interest name and further based on one or more of: a linear search; a binary search; and a number of collapsed name prefixes in a forwarding information base, wherein a collapsed name prefix indicates a plurality of name components with a same forwarding information in the forwarding information base.

In some embodiments, the system generates an initial interest for the index, wherein the initial interest is transmitted to a third party service and has a payload that includes the interest name and a public key of the third party service, wherein the payload of the initial interest is encrypted based on a public key of the client computing device, wherein the initial interest indicates the public key of the client computing device. In response to the initial interest, the system receives an initial content object that has a payload that indicates the index, wherein the payload of the initial content object is encrypted based on the public key of the third party service.

In some embodiments, the interest name includes one or more nested and encrypted names suffixes, and a name suffix comprises one or more contiguous name components of the interest name. The system determines a second index for a nested and encrypted name suffix, wherein the second index indicates a minimum number of contiguous name components beginning from the most general level that represent a minimum routable prefix needed to route the interest to a content producing device that can satisfy a nested interest with a name which includes the nested and encrypted name suffix. The system encrypts the name components following the name components corresponding to the second index.

BRIEF DESCRIPTION OF THE FIGURES

In the figures, like reference numerals refer to the same figure elements.

DETAILED DESCRIPTION

Figure 1:
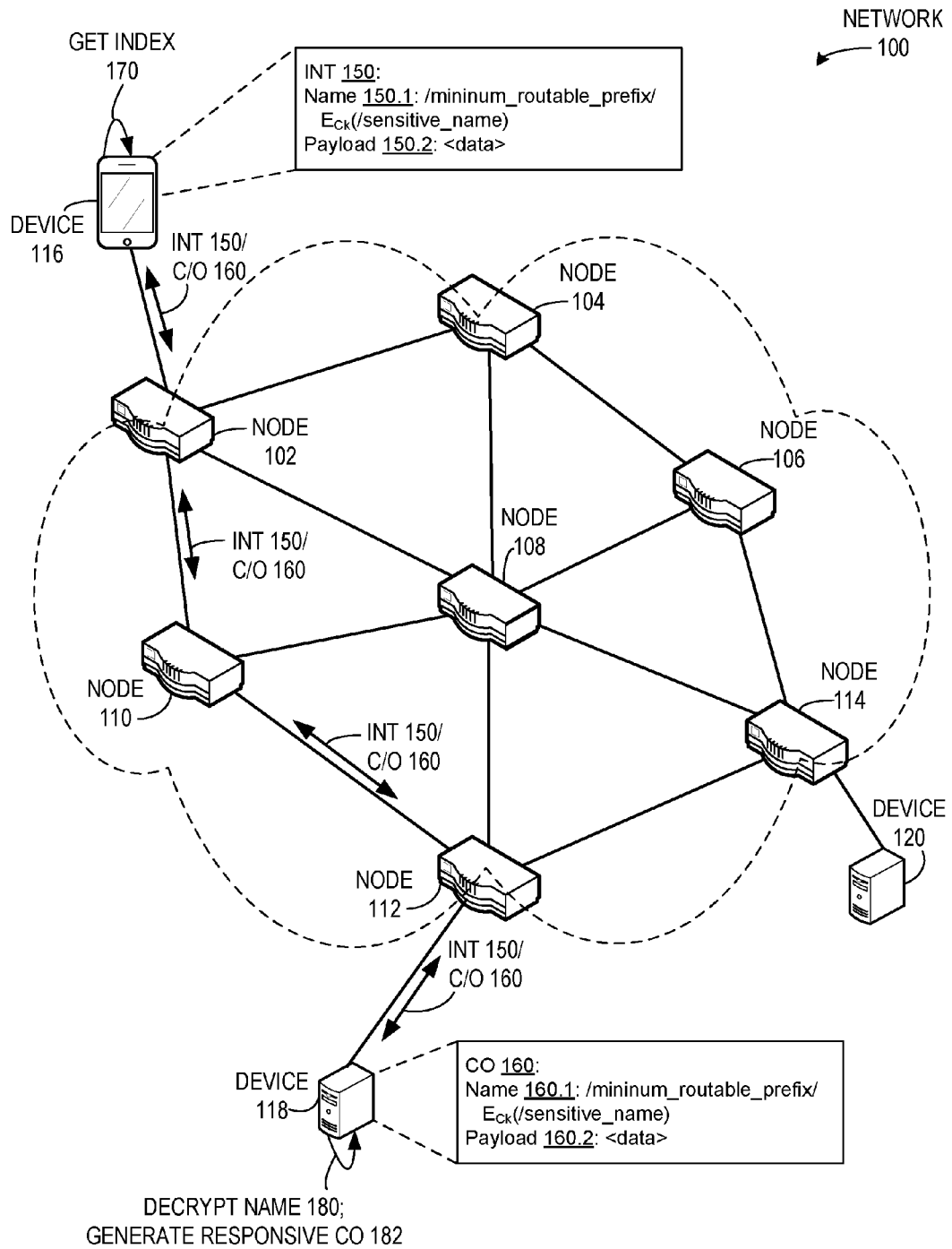
FIG. 1 illustrates an exemplary environment which facilitates efficient name encryption in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of efficiently encrypting a CCN name by providing a system which allows a consumer to determine the minimum routable prefix of a CCN name, which indicates the index in the name at which to begin encryption. A CCN data packet (e.g., an interest or a content object) is routed based on its name, which can include multiple name components. Some of the name components may be used for routing purposes, while other name components may contain sensitive user information or application-specific data. A consumer may encrypt the interest name, but a sufficient number of name components must remain unencrypted in order for the interest to be routed to a producer that can satisfy the interest or serve the requested content. Embodiments of the present system allow a consumer to determine this sufficient number of unencrypted name components, which is also known as the minimum routable prefix. The minimum routable prefix can correspond to an index in the CCN name, where the index indicates the position of a particular name component in the hierarchically structured variable length identifier that includes contiguous name components ordered from a most general level to a most specific level.

The consumer can discover the index based on three different methods: 1) a name-based negotiation protocol; 2) a route-based negotiation protocol; and 3) an explicit negotiation protocol. Name-based negotiation (the first method) can be based on a linear probing method or a binary probing method. The consumer can send probing interests with an increasing number of name components until a positive response is returned. For example, based on the linear probing method, given a name N of "/a/b/c/d/x/y/z," and a random nonce rx, the consumer can transmit a probing interest with the name "/a/r1" and if a negative response is received, the consumer can transmit another probing interest with the name "/a/b/r2." The consumer can continue sending probing interests, each with an additional name component, until it receives a positive response. The positive response can indicate the minimum routable prefix needed to properly route the interest, and thus can indicate the index within the name N at which the consumer may begin encryption. The name-based negotiation protocol using linear probing is described below in relation to FIGS. 2A and 2B. The consumer can also perform the name-based negotiation protocol based on binary probing, which is described below in relation to FIG. 2C.

Route-based negotiation (the second method) is an extension of name-based negotiation. The routing algorithm can account for the number of prefixes truncated or collapsed during publication. Each CCN node has a forwarding information base ("FIB"), which is a table with entries of name prefixes and corresponding outgoing interfaces. The FIB is used to route interests based on longest-prefix matches of their names. A FIB entry usually contains one name prefix and its corresponding outgoing interfaces. If two or more name prefixes correspond to the same outgoing interface, the CCN node may collapse or truncate the entries into one entry.

In the explicit negotiation protocol (the third method), a CCN producer delegates the negotiation to a third party service which is known to a consumer. The consumer can send an explicit request to the third party service for the index. A detailed description of the protocol based on explicit negotiation with the third party service is described below in relation to FIG. 3.

Thus, the system facilitates efficient name encryption in a CCN by allowing a consumer to discover the minimum routable prefix for an interest, which indicates a maximum number of name components needed to route the interest to a producer. The minimum routable prefix also indicates the index at which the consumer may begin encrypting the name.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847, 814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1 illustrates an exemplary environment which facilitates efficient name encryption in a content centric network, in accordance with an embodiment of the present invention. A network 100 can include a consumer or content requesting device 116, producers or content producing devices 118 and 120, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network.

During operation, consumer or client computing device 116 can determine, for a name N of "/a/b/c/d/x/y/z," an index at which device 116 may begin encrypting the name N (get index function 170, described in detail below in relation to FIGS. 2A-2C and 3). This index may be referred to as the "split index." The split index can indicate "3" as the "minimum_routable_prefix," which also indicates the remainder of the name N as the "sensitive_name" that can be encrypted. In other words, the split index can indicate the name prefix of the name N through the name component whose position index is equal to "3" (e.g., "a/b/c/d"), and can also indicate the name components following the name component whose position index is equal to 3 that can be encrypted (e.g., "/x/y/z"). Device 116 can generate an interest 150 with a name 150.1 of "/minimum_routable_prefix/$E_{Ck}$(/sensitive_name)," where "Ck" is the public key of consumer or device 116. Interest 150 can also include an optional payload 150.2 with a value of "<data>."

Interest 150 can travel through network 100 via nodes 102, 110, and 112, before reaching producer or content producing device 118. Device 118 can serve content or satisfy requests for content with the prefix of "/a/b/c/d" or "minimum_routable_prefix." Assume that device 118 is in possession of or has a way to retrieve the public key of device 116. Device 118 can decrypt the encrypted portion of name 150.1 of interest 150 (function 180), and generate a content object 160 corresponding to the name "/minimum_routable_prefix/sensitive_data" (function 182). Device 118 can replace a name 160.1 in content object 160 with the original partially encrypted name (e.g., name 150.1 with a value of "/minimum_routable_prefix/$E_{Ck}$(/sensitive_name)"), and transmits content object 160 to device 118 on a reverse path (e.g., via nodes 112, 110, and 102).

Name-Based Negotiation Based on Linear Probing

Figure 2A:
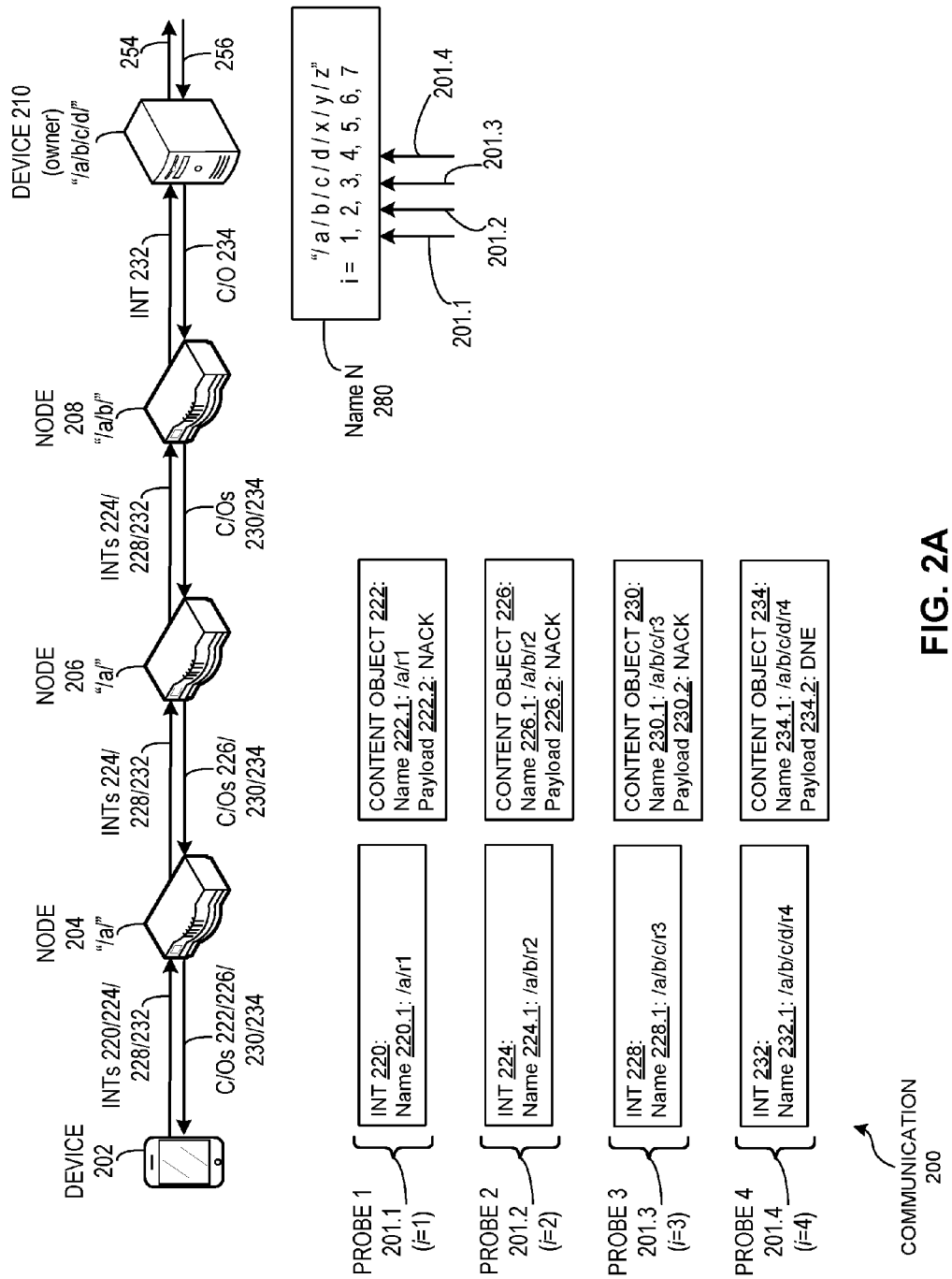
FIG. 2A illustrates an exemplary communication which facilitates efficient name encryption in a content centric network, based on a linear probing method, in accordance with an embodiment of the present invention.

A consumer can determine the split index (which indicates the minimum routable prefix) for a given name using a name-based negotiation by sending probing interests with an increasing number of name components. FIG. 2A illustrates an exemplary communication 200 which facilitates efficient name encryption in a content centric network, based on a linear probing method, in accordance with an embodiment of the present invention. Device 202 can be a consumer or a client computing device. Nodes 204 and 206 can be intermediate nodes or routers or content-hosting devices that can forward an interest with the prefix "/a." Node 208 can be an intermediate node or router or a content-hosting device that can forward an interest for the prefix "/a/b." Node 210 can be an intermediate node or router or a content-hosting device that can serve content for the prefix "/a/b/c/d." For the sake of illustration, nodes 204-208 are depicted as intermediate routers, and device 210 is depicted as a server, but any of entities 204-210 can be an intermediate router or a content-hosting device that can serve content (as described above).

Assume that a name N 280 has p name components, $N_1$-$N_p$, e.g., for a name N of "/a/b/c/d/x/y/z," p is equal to 7. The determined split index i indicates that all components $N_j$ where j is greater than i may be encrypted. In addition, the consumer can generate for each probe interest a random nonce rx that is appended to the name for a respective probing interest.

During operation, a consumer or a client computing device 202 can send a set of probes 200.1-200.4 to determine the split index i. For example, device 202 can generate and transmit an interest 220 with a name 220.1 of "/a/r1," which is a probing interest to determine whether the split index i=1. Interest 220 can travel to a node 204, which can determine based on its local FIB to forward interest 220 to node 206. Node 206 can determine based on its local FIB that no route exists for name 220.1. Node 206 can return a negative acknowledgment to device 202 in the form of a content object 222 with a name 222.1 of "/a/r1" and a payload 222.2 with a value of "NACK."

Device 202 can receive the NACK of content object 222, and determine to send another probing interest with an additional name component. Device 202 can generate and transmit an interest 224 with a name 224.1 of "/a/b/r2," which is a probing interest to determine whether the split index i=2. Interest 224 can reach node 204, which forwards interest 224 to node 206, which in turn forwards interest 224 to node 208. Node 208 can determine based on its local FIB that no route exists for name 224.1. Node 208 can return a negative acknowledgment to device 202 in the form of a content object 226 with a name 226.1 of "/a/b/r2" and a payload 226.2 with a value of "NACK."

Device 202 can receive the NACK of content object 226, and determine to send another probing interest with an additional name component. Device 202 can generate and transmit an interest 228 with a name 228.1 of "/a/b/c/r3," which is a probing interest to determine whether the split index i=3. Interest 228 can reach node 204, which forwards interest 228 to node 206, which in turn forwards interest 228 to node 208. Node 208 can determine based on its local FIB that no route exists for name 228.1. Node 208 can return a negative acknowledgment to device 202 in the form of a content object 230 with a name 230.1 of "/a/b/c/r3" and a payload 230.2 with a value of "NACK."

Finally, device 202 can receive the NACK of content object 230, and determine to send another probing interest with an additional name component. Device 202 can generate and transmit an interest 232 with a name 232.1 of "/a/b/c/d/r4," which is a probing interest to determine whether the split index i=4. Interest 232 can reach node 204, which forwards interest 232 to node 206, which in turn forwards interest 232 to node 208, which in turn forwards interest 232 to device 210. Device 210 can determine that it can serve content under the prefix "/a/b/c/d," but that the content corresponding to name 232.1 does not exist ("DNE"). Device 210 can return a positive acknowledgment to device 202 in the form of a content object 234 with a name 234.1 of "/a/b/c/d/r4" and a payload 234.2 with a value of "DNE."

Device 202, in possession of a positive acknowledgment from probes 201.1-201.4, can determine that content object 234 indicates that a content producing device can return a content object with the minimum routable prefix of "/a/b/c/d." Device 202 can also determine that the key identifier of content object 234 matches the key identifier of the public key of content producing device 210. This allows device 202 to determine that the minimum routable prefix for the name N of "/a/b/c/d/x/y/z" is "/a/b/c/d," and that the split index i is equal to 4 (or 3, when the index count begins at zero instead of at one).

Figure 2B:
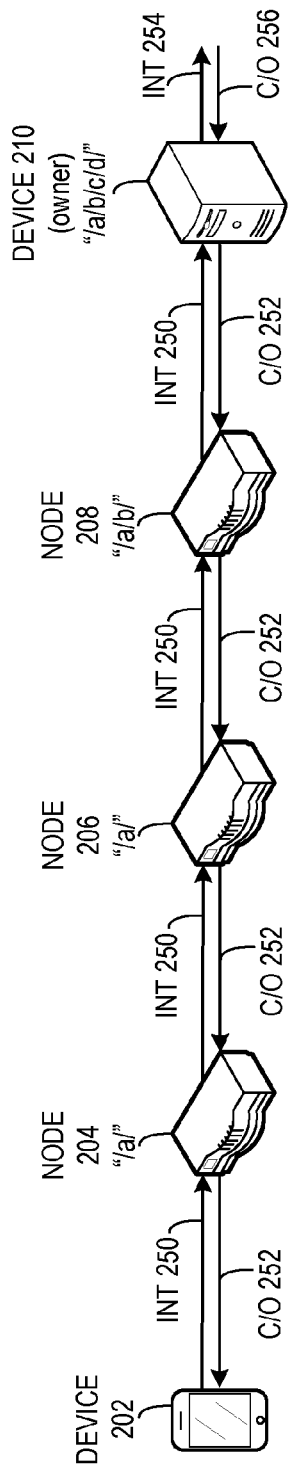
FIG. 2B illustrates an exemplary communication which facilitates efficient name encryption in a content centric network, based on a linear probing method, in accordance with an embodiment of the present invention.

FIG. 2B illustrates an exemplary communication 240 which facilitates efficient name encryption in a content centric network, based on a linear probing method, in accordance with an embodiment of the present invention. FIG. 2B corresponds to FIG. 2A. Device 202 can use the determined split index i=4 to encrypt the name components of name N starting from the name component following the name component at index 4 (e.g., after the minimum routable prefix name of "/a/b/c/d"). Device 202 can generate and transmit an encrypted interest 250 with a name 250.1 of "/a/b/c/d/$E_{Ck}$(/x/y/z)," which interest travels via nodes 204, 206, and 208 until it reaches device 210. Device 210 can decrypt the encrypted portion of name 250.1 based on a public key of device 202, and generate a responsive content object 252 with a payload 252.2 of "<data>" that corresponds to the unencrypted name. Device 210 can further replace the unencrypted name with a name 252.1 of "/a/b/c/d/$E_{Ck}$(/x/y/z)," which matches name 250.1 of interest 250. Device 210 can then return content object 252 to device 202 along a reverse path.

Device 210 can also obtain the content corresponding to the decrypted name from a different entity in the network. Thus, device 210 can generate and transmit an interest 254 with a name 254.1 of "/a/b/c/d/x/y/z," and receive a responsive content object 256 with a name 256.1 of "/a/b/c/d/x/y/z" and a payload 256.2 of "<data>." Device 210 can subsequently create a content object 252 as described above (by replacing name 256.1 with name 252.1), and return 252 to device 202 along the reverse path.

An example of pseudocode for a linear probe function is provided herein:

```
def LinearProbe (N, low, high):
    for i = low to high do
        Ri := GenerateRandomNonce( )
        Probe := [N1, ..., Ni].Append(Ri)
        Content Object = RequestInterestWithName(Probe)
        if (ContentObject == DNE and
                ContentObject.KeyId == KeyId(pk))
            return i
        end
    done
    return -1 // error
```

Thus, the consumer can perform a name-based negotiation using a linear probing method to determine the split index for subsequent encryption of an interest name. Using only the name N, the consumer can call the function as:

split_index=LinearProbe(N,0,len(N)−1)  Function (1)

The term "len(N)" is equal to the number of name components in N, and the function LinearProbe( ) is performed on a zero-based index count.

Name-Based Negotiation Based on Binary Probing

Figure 2C:
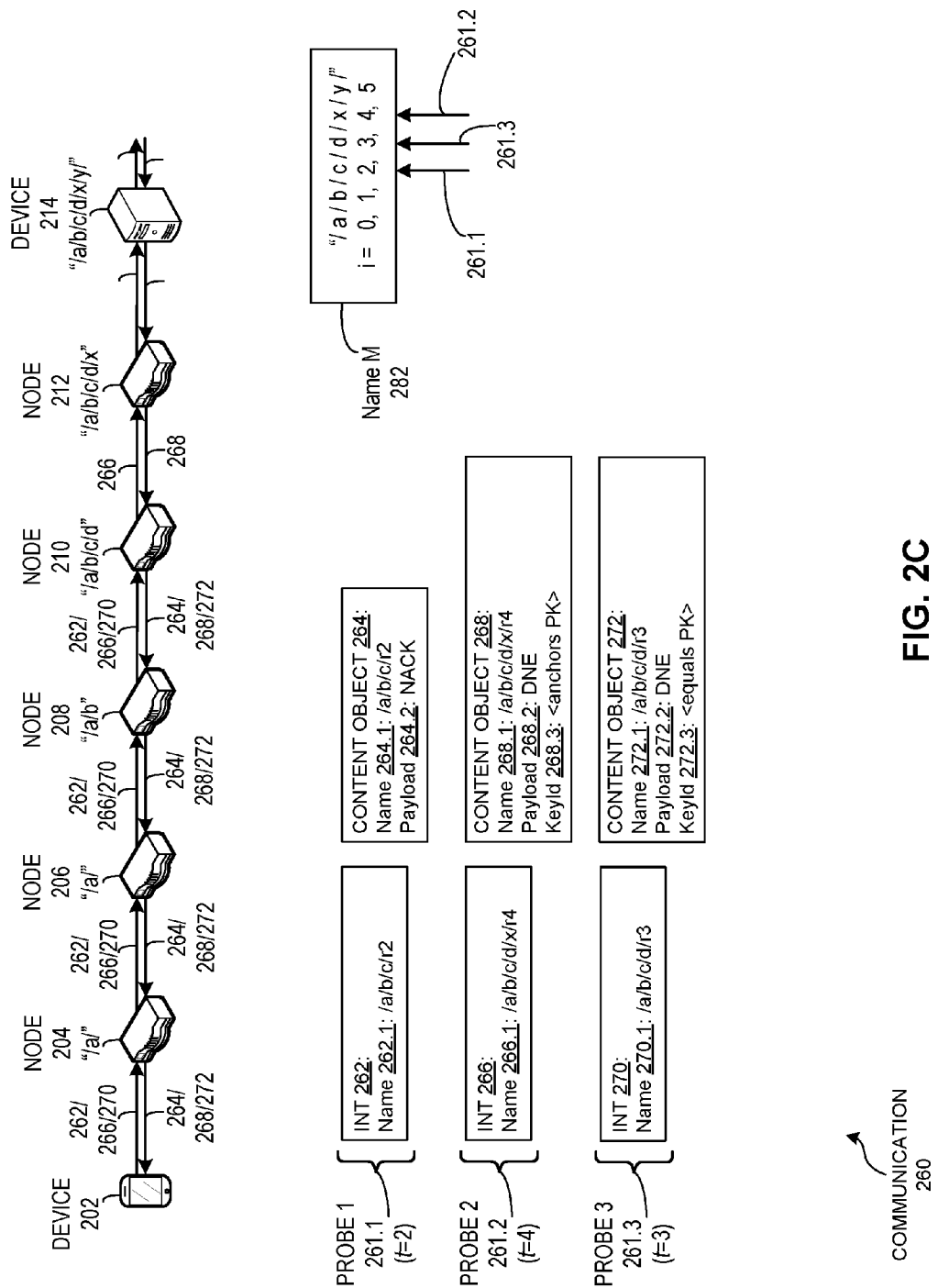
FIG. 2C illustrates an exemplary communication which facilitates efficient name encryption in a content centric network, based on a binary probing method, in accordance with an embodiment of the present invention.

FIG. 2C illustrates an exemplary communication 260 which facilitates efficient name encryption in a content centric network, based on a binary probing method, in accordance with an embodiment of the present invention. FIG. 2C includes device 202 and nodes 204-210, which correspond to the same entities depicted in FIG. 2A. FIG. 2C additionally includes a node 212 which can be an intermediate node or router or a content-hosting device that can forward an interest with the prefix "/a/b/c/d/x," and a node or device 214 which can be an intermediate node or router or a content-hosting device that can serve content for the prefix "/a/b/c/d/x/y."

Assume that a name 282 hasp name components, $M_1$-$M_p$, e.g., for a name M 282 of "/a/b/c/d/x/y," p is equal to 6. Note that the index count shown for name M 282 is a zero-based count, i.e., the index number begins from zero, which is different from the index count shown for name N 280 of FIG. 2A, which begins from "1." During operation, a consumer or a client computing device 202 can send a set of probes 261.1-261.3 to determine the split index. Device 202 can determine a midpoint target index of t=2 for the name components $M_1$-$M_p$, where a lower portion of the name consists of the name components from $M_1$-$M_{t-1}$, and an upper portion of the name consists of the name components from $M_{t+1}$ to $M_p$. Device 202 can generate and transmit an interest 262 with a name 262.1 of "/a/b/c/r2." Interest 262 can reach node 204, which forwards interest 262 to node 206, which in turn forwards interest 262 to node 208. Node 208 can determine based on its local FIB that no route exists for name 262.1. Node 208 can return a negative acknowledgment to device 202 in the form of a content object 264 with a name 264.1 of "/a/b/c/r3" and a payload 264.2 with a value of "NACK."

Based on the NACK of content object 264, device 202 can determine to continue the binary probe on the upper portion of the name. Device 202 can determine a new midpoint target index t=4 of the upper portion (and again determine a new lower and upper portion of the name based on the new midpoint target index). Device 202 can generate and transmit an interest 266 with a name 266.1 of "/a/b/c/d/x/r4." Interest 266 can reach node 204, which forwards interest 266 to node 206, which in turn forwards interest 266 to node 208, which in turn forwards interest 266 to node 210, which in turn forwards interest 266 to node 212. Node 212 can determine that it can serve content under the prefix "/a/b/c/d/x," but that the content corresponding to name 266.1 does not exist ("DNE"). Node or device 212 can return a positive acknowledgment to device 202 in the form of a content object 268 with a name 268.1 of "/a/b/c/d/x/r4" and a payload 234.2 with a value of "DNE." Node 212 can further include in content object 268 a KeyId 268.3 which indicates that its KeyId anchors or is associated with the public key of a producer of content for a number of name components less than t+1 (e.g., which allows consumer or client computing device 202 to determine that the key identifier for content object 268 is associated with the key identifier of a public key of a content producing device that can serve the requested content).

Upon receiving content object 268, device 202 can determine from the DNE of payload 268.2 and the anchor indication of KeyId 268.3 to continue the binary probe search on the (new) lower portion of the name. Device 202 can determine an updated midpoint target index t=3 of the (new) lower portion (and, if necessary, determine an updated lower and upper portion of the name based on the updated midpoint target index). Device 202 can generate and transmit an interest 270 with a name 270.1 of "/a/b/c/d/r3." Interest 270 can reach node 204, which forwards interest 270 to node 206, which in turn forwards interest 270 to node 208, which in turn forwards interest 270 to node 210. Node or device 210 can determine that it can serve content under the prefix "/a/b/c/d/x," but that the content corresponding to name 270.1 does not exist ("DNE"). Device 210 can return a positive acknowledgment to device 202 in the form of a content object 272 with a name 272.1 of "/a/b/c/d/x/r4" and a payload 272.2 with a value of "DNE." Device 210 can further include in content object 272 a KeyId 272.3 which indicates that its KeyId matches the public key of a producer of content for a number of name components equal to t (e.g., which allows consumer or client computing device 202 to determine that the key identifier for content object 272 matches the key identifier of a public key of a content producing device that can serve the requested content).

Device 202, in possession of a positive acknowledgment from probes 261.1-261.3, can determine that content object 272 indicates that a content producing device can return a content object with the minimum routable prefix of "/a/b/c/d." Device 202 can also determine that the key identifier of content object 272 matches the key identifier of the public key of the content producing device. This allows device 202 to determine that the minimum routable prefix for the name N of "/a/b/c/d/x/y/z" is "/a/b/c/d," and that the split index i is equal to 3 (in the case of a zero-based index count). Device 202 can subsequently send an encrypted interest 250, as shown in relation to communication 240 of FIG. 2B.

An example of pseudocode for a binary probe function is provided herein:

```
def BinaryProbe(N, low, high):
    i := ((high − low) / 2)
    visited = [ ]
    while len(visited) < (high − low) do
        Ri := GenerateRandomNonce( )
        Probe := [N1, ..., Ni, ..., N(low + i)].Append(Ri)
        ContentObject = RequestInterestWithName(Probe)
        if (KeyId(pk) anchors ContentObject.KeyId and
                ContentObject == DNE) then
            visited.Append(i + low); i := i − (i / 2)
        elseif (ContentObject.KeyId == KeyId(pk) and
                ContentObject == DNE)
            return i + low
        else // != KeyId or a NACK (P cannot serve probe)
            visited.Append(i + low); i := i − (i / 2)
    end
    return −1 // error
```

Thus, the consumer can perform a name-based negotiation using a binary probing method to determine the split index for subsequent encryption of an interest name. Using only the name N, the consumer can call the function as:

split_index=BinaryProbe($N$,0,len($N$)−1)    Function (2)

The term "len(N)" is equal to the number of name components in N, and the function BinaryProbe( ) is performed on a zero-based index count.

The consumer can also generate and transmit nested probing interests within each other. The probing interests can be sent and processed similar to onion routing, where each gateway or decrypting node acts as an application-layer gateway or forwarder for the nested probe on behalf of the original issuer. For example, for an interest with a name N of "/a/b/c/MARK</d/e/f/MARK</g/h/i/>>," where "MARK" indicates that the following suffix is encrypted, the consumer can send out probing interests that corresponds to each "layer" of the name. A first probing interest may include a name N0 of "/a/b/c/MARK</d/e/f/MARK</g/h/i/>>," which can return a first index that corresponds to a minimum routable prefix for the outer layer. A second probing interest may include a name N1 of "/a/b/c/d/e/f/MARK<g/h/i/>," which can return a second index that corresponds to a minimum routable prefix for that respective layer. Finally, a third probing interest may include a name N2 of "/a/b/c/d/e/f/g/h/i/," which can return a third index that corresponds to a minimum routable prefix for that respective layer. In addition, name prefixes may be inherited (as described in the example above), or name prefixes may not be inherited, e.g.: N0="/a/b/c/MARK</d/e/f/MARK</g/h/i/>>"; N1="/d/e/f/MARK</g/h/i/"; and N2="/g/h/i."

Route-Based Negotiation

An extension of the name-based negotiation protocol is route-based negotiation, where the routing algorithm takes into account the number of prefixes that were truncated or collapsed during publication. Recall that a CCN node has a forwarding information base ("FIB") which is a table with entries of name prefixes and corresponding outgoing interfaces. If two or more name prefixes correspond to the same outgoing interface, the CCN node may collapse or truncate the entries into one entry. A local FIB can contain the minimum number of hops to the nearest anchor for a given prefix. For example, in FIG. 2A, if the local FIB for node 204 has a first entry for the name prefix "/a" which corresponds to an interface(s) associated with node 206, and a second entry for the name prefix "/a/b" which also corresponds to an interface(s) associated with node 208, then node 204 can collapse or truncate the names prefixes in its FIB. If 1* indicates the total number of name prefixes in the name (taking into account the collapsed name prefixes under this extension to the protocol), the consumer can call the function as:

split_index=LinearProbe($N$,1*,len($N$)−1); or    Function (3)

split_index=BinaryProbe($N$,1*,len($N$)−1).    Function (4)

Explicit Negotiation Protocol

Figure 3:
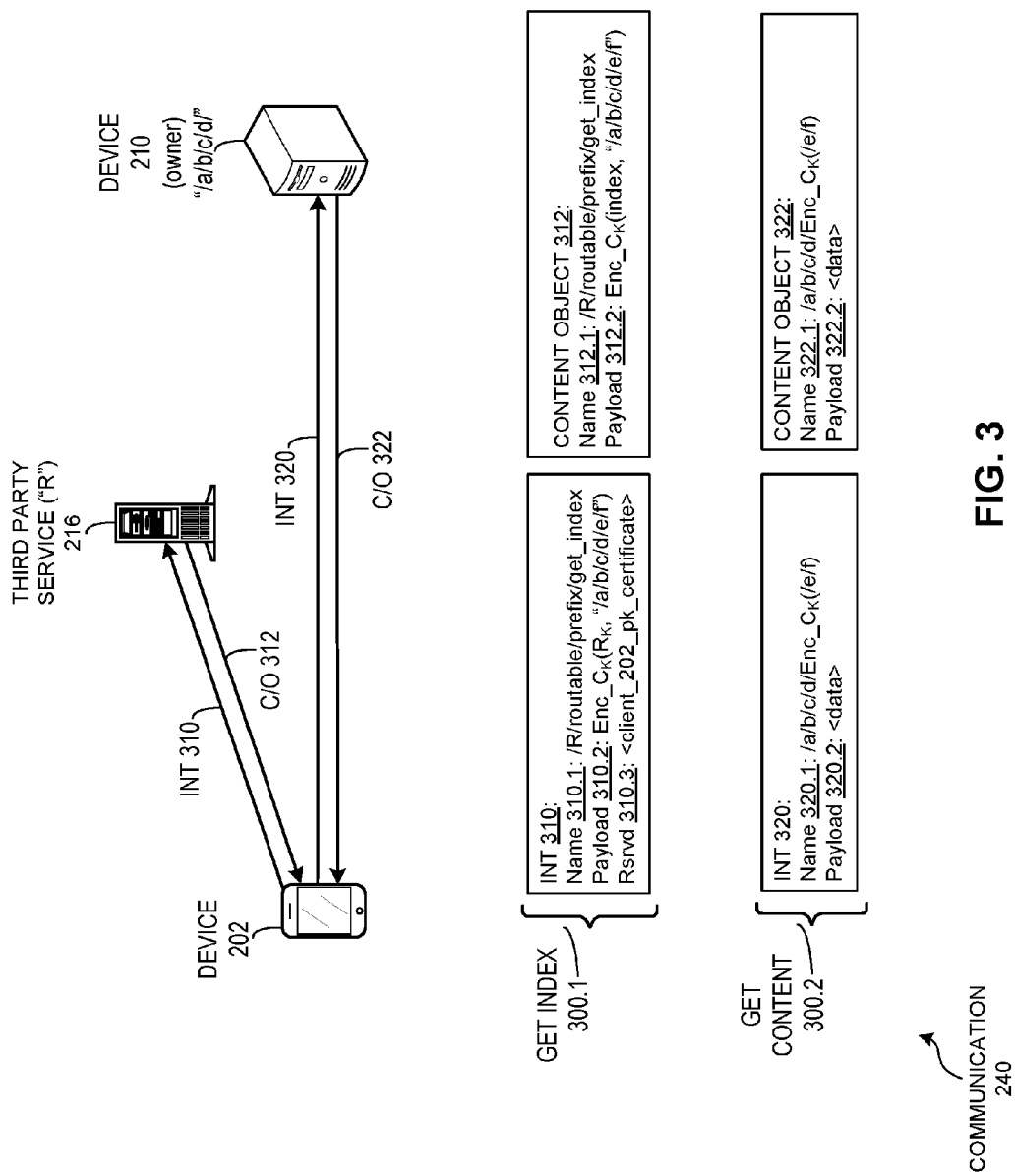
FIG. 3 illustrates an exemplary communication which facilitates efficient name encryption in a content centric network, including communication with a third party service, in accordance with an embodiment of the present invention.

FIG. 3 illustrates an exemplary communication 300 which facilitates efficient name encryption in a content centric network, including communication with a third party service, in accordance with an embodiment of the present invention. FIG. 3 includes a consumer or client computing device 202, a content-hosting or content-producing device 210, and a third party service ("R") 216 to which device 210 has delegated responsibility in the negotiation protocol for determining the split index. Device 202 can perform an explicit request for the split index for a target name N. Device can 202 can also possess "Rk," the public key of R 216. For example, for a target name N of "/a/b/c/d/e/f," device 202 can perform a get index 300.1 function by sending an interest 310 with a name 310.1 of "/R/routable/prefix/get_index," a payload 310.2 of "$E_{Ck}$(Rk, "/a/b/c/d/e/f)," and a reserved field 310.3 which indicates a public key certificate of device 202 (e.g., "<client_202_pk_certificate>"). Third party service R 216 can receive interest 310, decrypt the encrypted payload 310.2 to obtain the target name N, and determine the appropriate split index i. R 216 can generate and transmit a content object 312 with a name 312.1 of "/R/routable/prefix/get_index" and a payload 312.2 of "$E_{Ck}$(i, "/a/b/c/d/e/f)."

Upon discovering the split index i, device 202 can retrieve content via a get content 300.2 function by generating and transmitting an interest 320 with a name 320.1 of "/a/b/c/d/$E_{Ck}$(/e/f)" and an optional payload 320.2 of "<data>." Device 210 can receive interest 320, decrypt the encrypted portion of the name 320.1, generate a responsive content object 322 with a name 322.1 which matches the encrypted name 320.1 of interest 320 and includes a payload 322.2 with a value of "<data>." Device 210 can transmit content object 322 to device 202 along a reverse path.

Role of Client-Computing Device in Facilitating Efficient Name Encryption

Figure 4A:
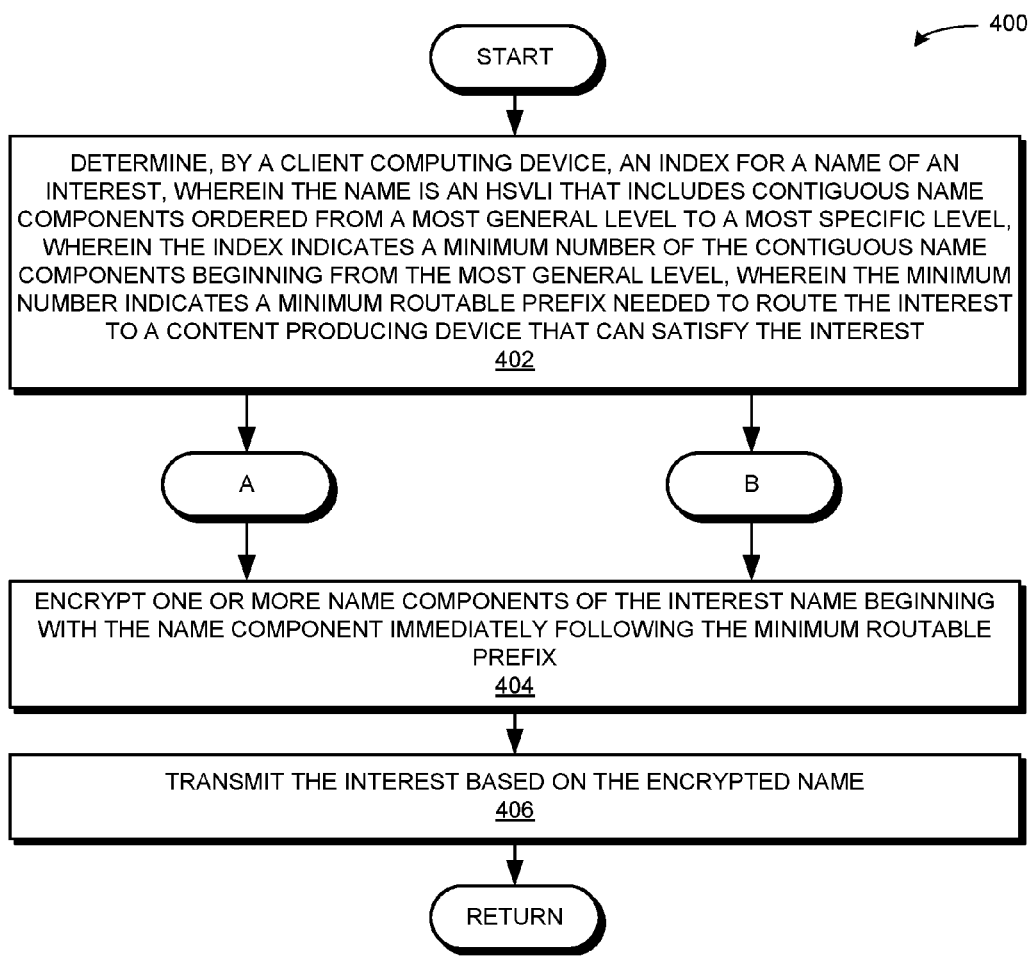
FIG. 4A presents a flow chart illustrating a method by a client computing device for facilitating efficient name encryption in a content centric network, in accordance with an embodiment of the present invention.

FIG. 4A presents a flow chart 400 illustrating a method by a client computing device for facilitating efficient name encryption in a content centric network, in accordance with an embodiment of the present invention. During operation, the system determines, by a client computing device, an index for a name of an interest, wherein the name is an HSVLI that includes contiguous name components ordered from a most general level to a most specific level (operation 402). The index indicates a minimum number of the contiguous name components beginning from the most general level that represent a minimum routable prefix needed to route the interest to a content producing device that can satisfy the interest. The operation can continue based on a linear probe (as indicated at Label A of FIG. 4B) or based on a binary probe (as indicated at Label B of FIG. 4C). The system encrypts one or more name components of the interest name beginning with the name component immediately following the minimum routable prefix (operation 404). The system transmits the interest based on the encrypted name (operation 406).

Figure 4B:
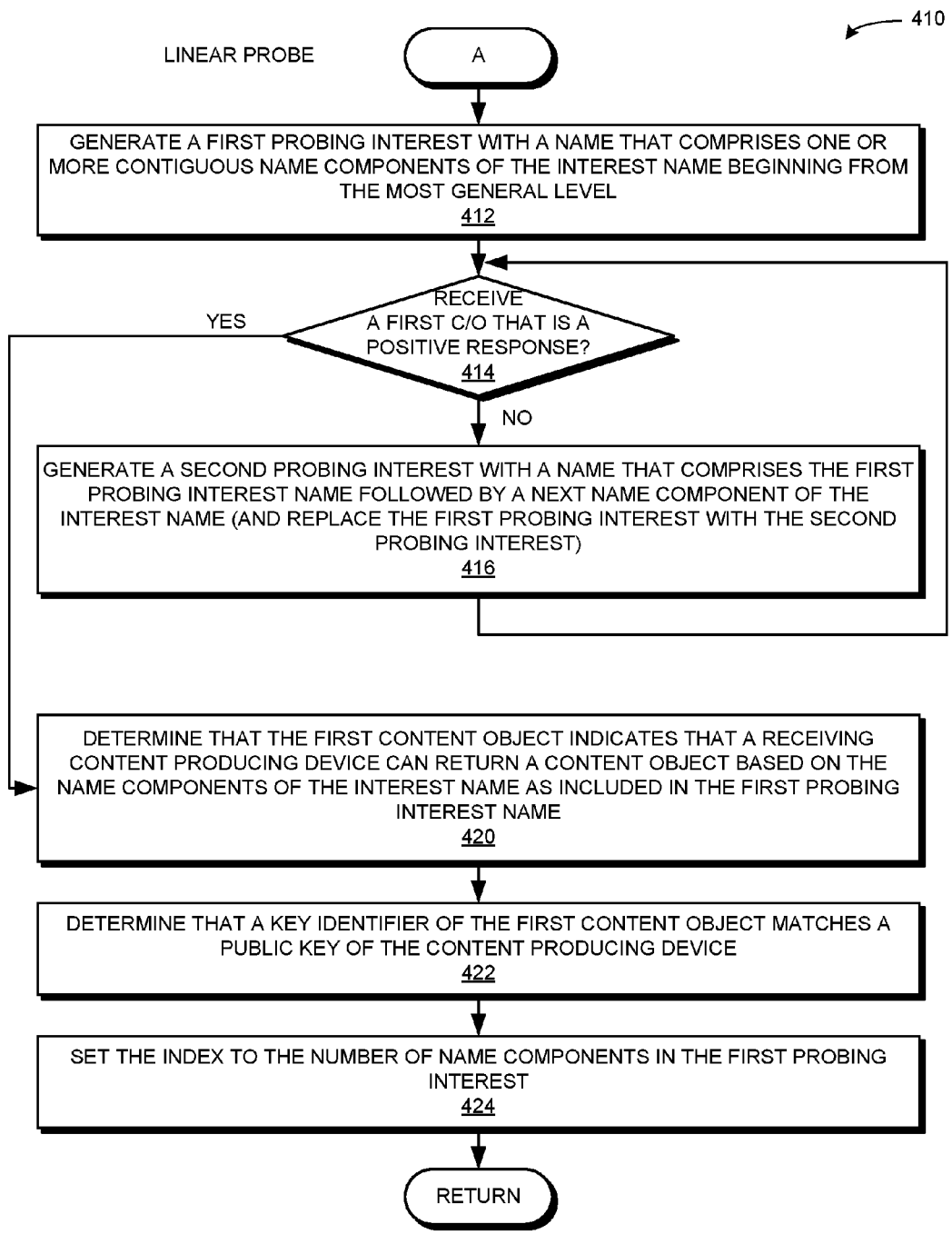
FIG. 4B presents a flow chart illustrating a method by a client computing device for facilitating efficient name encryption in a content centric network, based on a linear probing method, in accordance with an embodiment of the present invention.

FIG. 4B presents a flow chart 410 illustrating a method by a client computing device for facilitating efficient name encryption in a content centric network, based on a linear probing method, in accordance with an embodiment of the present invention. During operation, the system generates a first probing interest with a name that comprises one or more contiguous name components of the interest name beginning from the most general level (operation 412). The system can generate and append a random nonce to a probing interest, as described above in relation to FIG. 2A. The system determines whether it receives a first content object that indicates a positive response (decision 414). If it does, the system determines that the first content object indicates that a content producing device can return a content object based on the name components of the interest name as included in the first probing interest (operation 420). The system further determines that a key identifier of the first content object matches a public key of the content producing device (operation 422). The system then sets the index to the number of name components in the first probing interest (operation 424). The positive response can also be indicated with any other indicator, such as a notification flag or a reserved field or bit.

If the system determines that it receives a first content object that is not a positive response (i.e., the first content object indicates a negative response) (decision 414), the system generates a second probing interest with a name that comprises the first probing interest name followed by a next name component of the interest name (operation 416). The system can replace the first probing interest with the second probing interest (for purposes of looping), and the operation returns to decision 414, where the system determines whether it receives a first content object that is a positive response to the first probing interest (i.e., the second probing interest previously generated in operation 416). The operations continue until a positive response is received, and the system performs operations 420, 422, and 424 as described above. If the operation reaches the end of the name (e.g., processes all name components) and does not return the index, the operation can return an error (not shown).

Figure 4C:
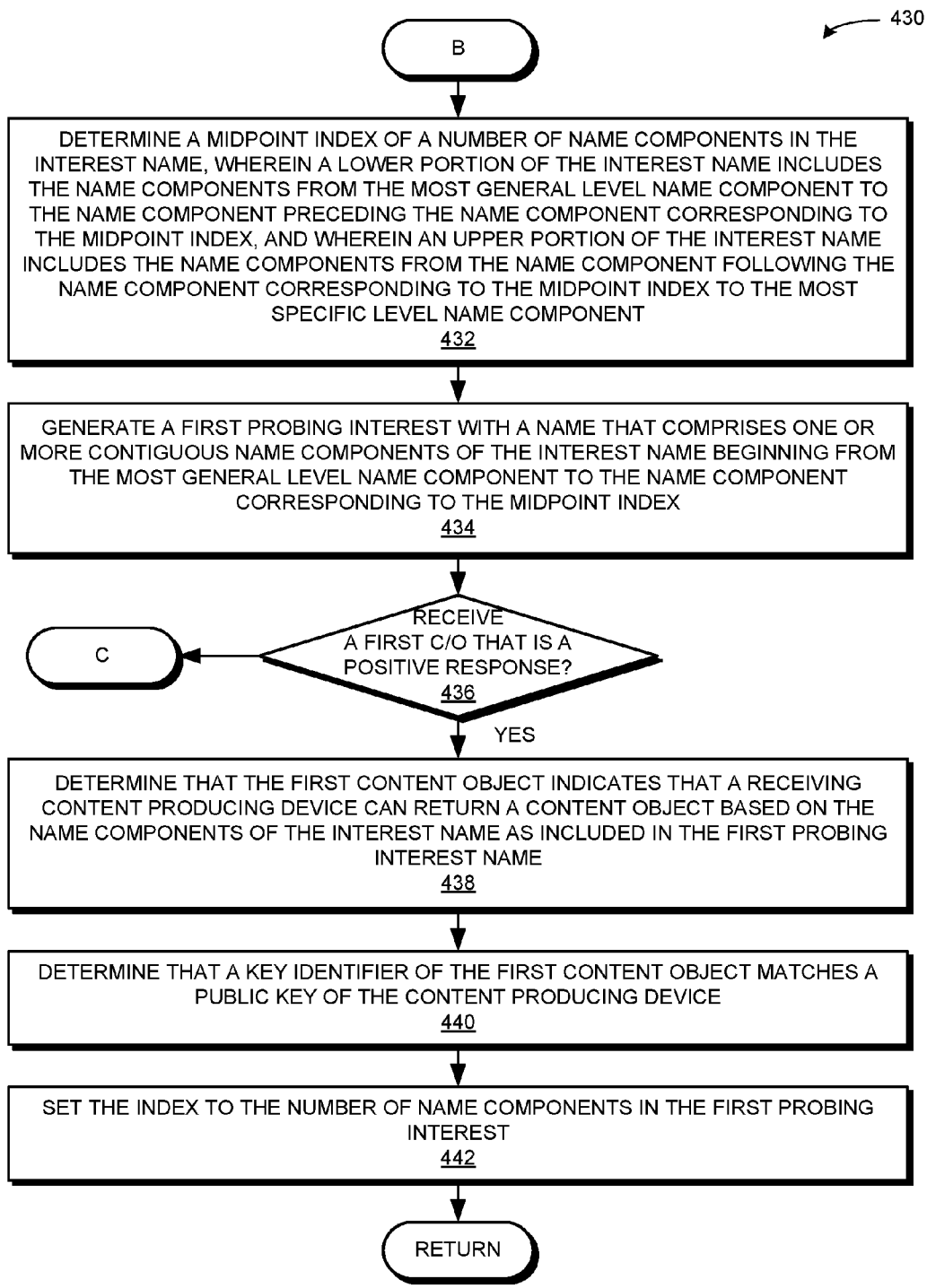
FIG. 4C presents a flow chart illustrating a method by a client computing device for facilitating efficient name encryption in a content centric network, based on a binary probing method, in accordance with an embodiment of the present invention.

FIG. 4C presents a flow chart 430 illustrating a method by a client computing device for facilitating efficient name encryption in a content centric network, based on a binary probing method, in accordance with an embodiment of the present invention. During operation, the system determines a midpoint index of the number of name components in the interest name (operation 432). A lower portion of the interest name includes the name components from the most general level name component to the name component preceding the name component corresponding to the midpoint index, and an upper portion of the interest name includes the name components from the name component following the name component corresponding to the midpoint index to the most specific level name component. The system generates a first probing interest with a name that comprises one or more contiguous name components of the interest name beginning from the most general level to the name component corresponding to the midpoint index (operation 434). The system can generate and append a random nonce to a probing interest, as described above in relation to FIG. 2A.

The system determines whether it receives a first content object that indicates a positive response (decision 436). If it does, the system determines that the first content object indicates that a content producing device can return a content object based on the name components of the interest name as included in the first probing interest (operation 438). The system further determines that a key identifier of the first content object matches a public key of the content producing device (operation 440). The system then sets the index to the number of name components in the first probing interest (operation 442). The positive response can also be indicated with any other indicator, such as a notification flag or a reserved field or bit.

Figure 4D:
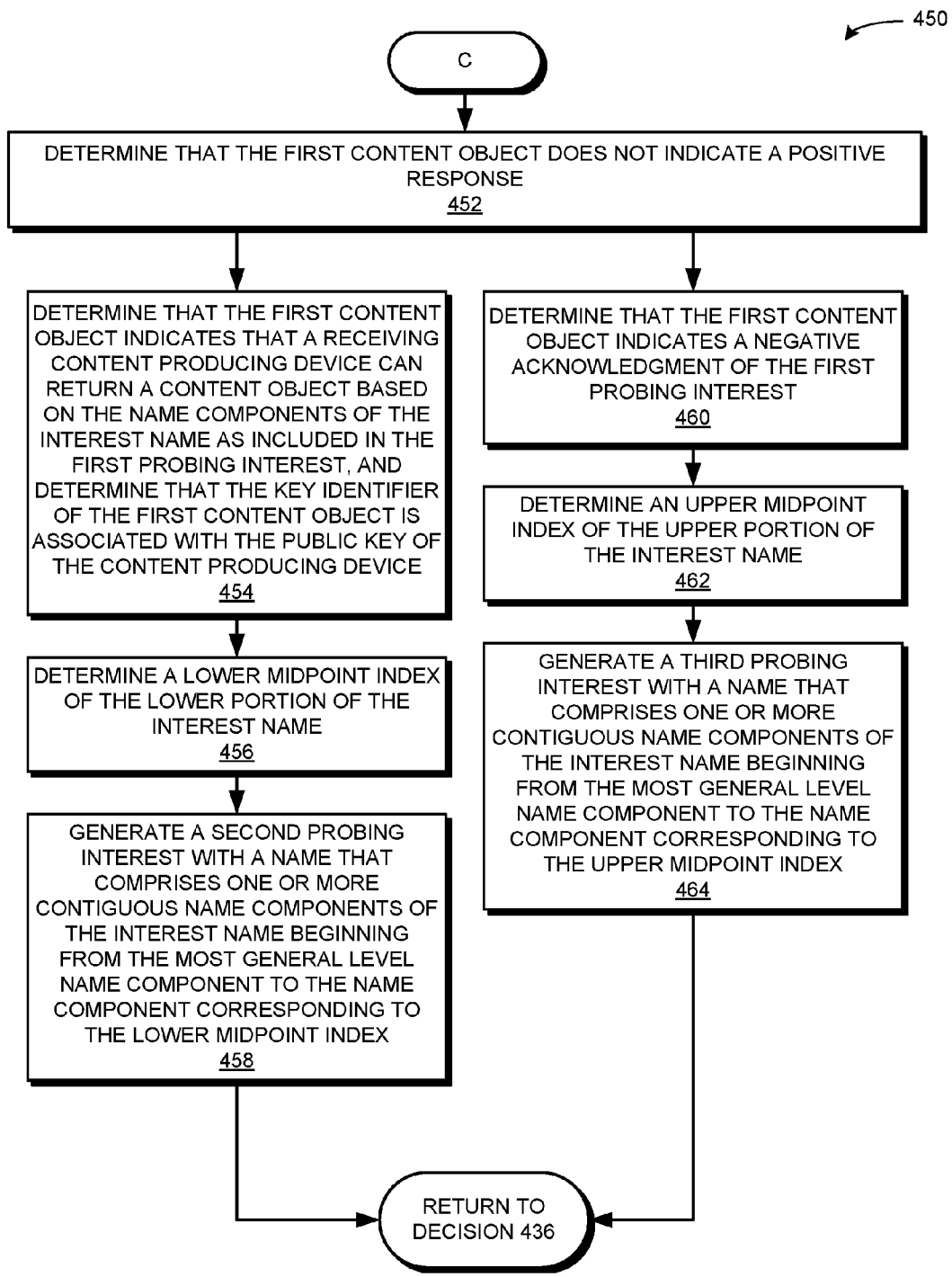
FIG. 4D presents a flow chart illustrating a method by a client computing device for facilitating efficient name encryption in a content centric network, based on a binary probing method, in accordance with an embodiment of the present invention.

If the system determines that it receives a first content object that is not a positive response (i.e., the first content object indicates a negative response) (decision 436), the operation continues as indicated at label C of FIG. 4D. FIG. 4D presents a flow chart 450 illustrating a method by a client computing device for facilitating efficient name encryption in a content centric network, based on a binary probing method, in accordance with an embodiment of the present invention. The system determines that the first content object does not indicate a positive response (operation 452), and the operation can continue as depicted by operation 454 or by operation 460. The system can determine that the first content object indicates that a content producing device can return a content object based on the interest name as included in the first probing interest, and can further determine that the key identifier of the first content object is associated with the public key of the content producing device (operation 454). The system can determine a lower midpoint index of the lower portion of the interest name (operation 456). The system can generate a second probing interest with a name that comprises one or more contiguous name components of the interest name beginning from the most general level name component to the name component corresponding to the lower midpoint index (operation 458). The system can replace the first probing interest with the second probing interest (for purposes of recursion), and the operation returns to decision 436, where the system determines whether it receives a first content object that is a positive response to the first probing interest (i.e., the second probing interest previously generated in operation 458). This begins the binary probe search again on the lower portion of the interest name.

Alternatively, after operation 452, the system can determine that the first content object indicates a negative acknowledgment of the first probing interest (operation 460). The system can determine an upper midpoint index of the upper portion of the interest name (operation 462). The system can generate a third probing interest with a name that comprises one or more contiguous name components of the interest name beginning from the most general level name component to the name component corresponding to the upper midpoint index (operation 464). As described above, the system can replace the first probing interest with the second probing interest (for purposes of recursion), and the operation returns to decision 436, which begins the binary probe search again on the upper portion of the interest name.

Figure 5:
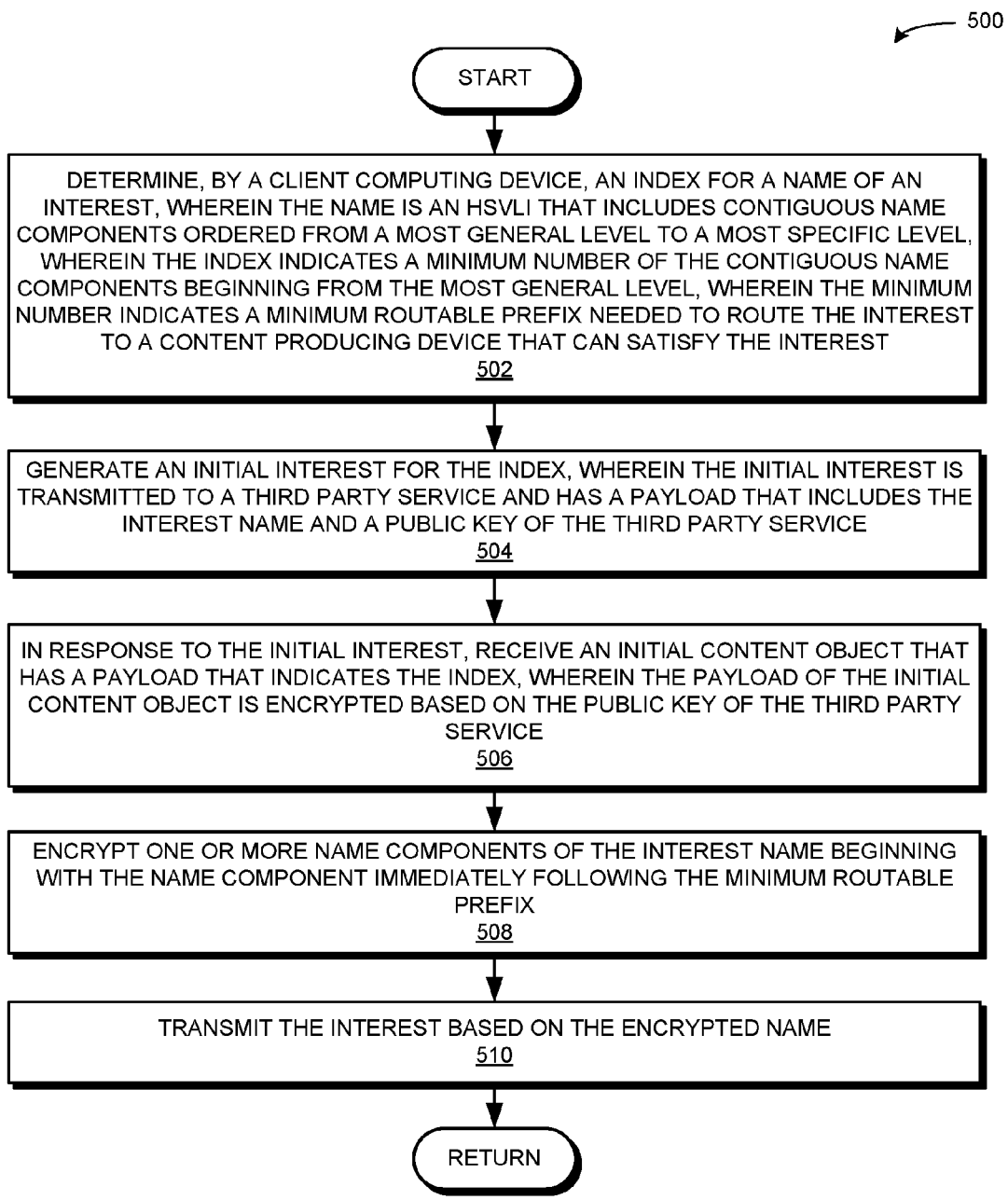
FIG. 5 presents a flow chart illustrating a method by a client computing device for facilitating efficient name encryption in a content centric network, including communication with a third party service, in accordance with an embodiment of the present invention.

FIG. 5 presents a flow chart 500 illustrating a method by a client computing device for facilitating efficient name encryption in a content centric network, including communication with a third party service, in accordance with an embodiment of the present invention. During operation, the system determines, by a client computing device, an index for a name of an interest, wherein the name is an HSVLI that includes contiguous name components ordered from a most general level to a most specific level (operation 502). The index indicates a minimum number of the contiguous name components beginning from the most general level, wherein the minimum number indicates a minimum routable prefix needed to route the interest to a content producing device that can satisfy the interest. The system generates an initial interest for the index, wherein the initial interest is transmitted to a third party service and has a payload that includes the interest name and a public key of the third party service (operation 504). The payload of the initial interest is encrypted based on a public key of the client computing device, and the initial interest indicates the public key of the client computing device.

In response to the initial interest, the system receives an initial content object that has a payload that indicates the index, wherein the payload of the initial content object is encrypted based on the public key of the third party service (operation 506). The system encrypts one or more name components of the interest name beginning with the name component immediately following the minimum routable prefix (operation 508). Subsequently, the system transmits the interest based on the encrypted name (operation 510).

Role of Content-Hosting Device in Facilitating Efficient Name Encryption

Figure 6:
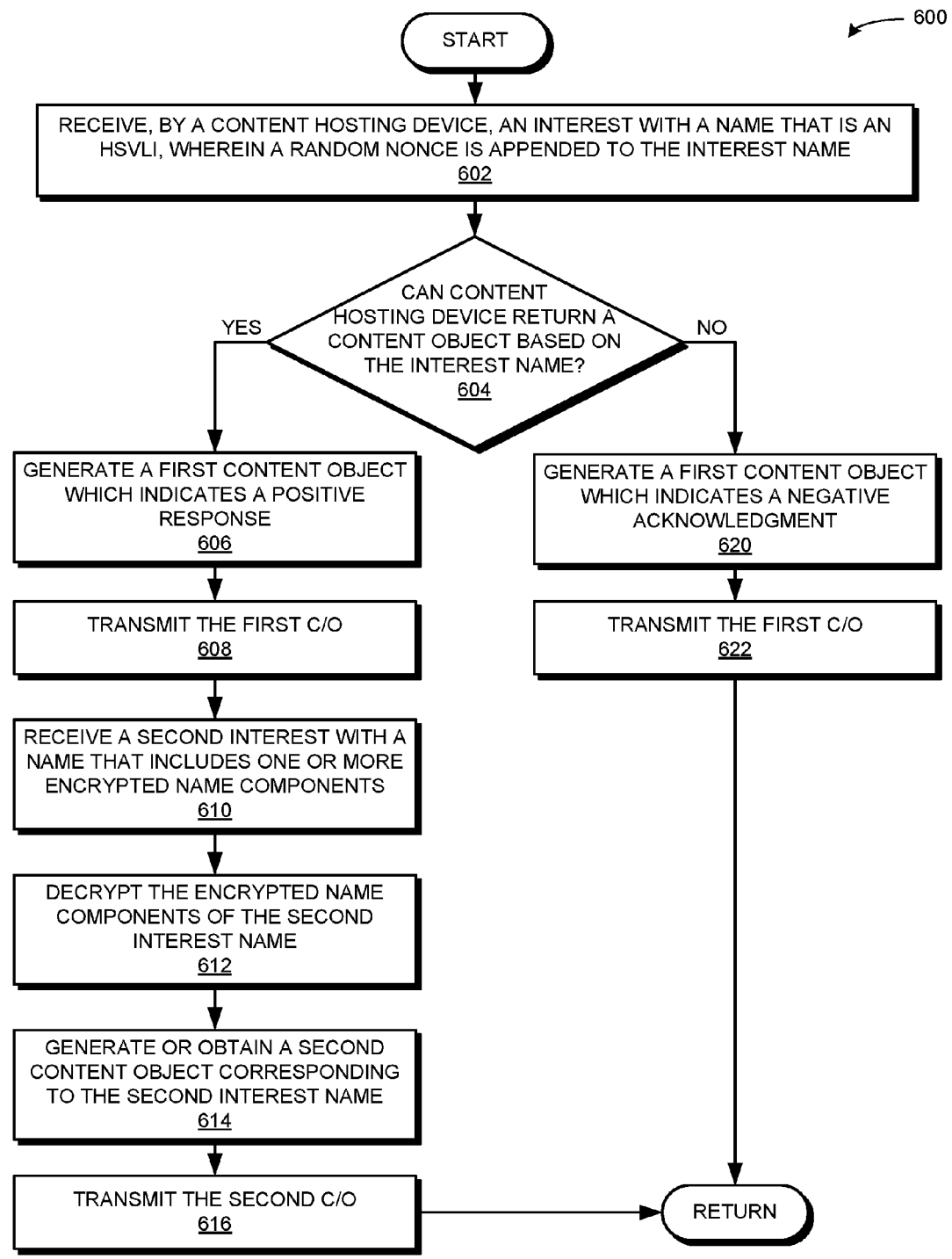
FIG. 6 presents a flow chart illustrating a method by a content-hosting device for facilitating efficient name encryption in a content centric network, in accordance with an embodiment of the present invention.

FIG. 6 presents a flow chart 600 illustrating a method by a content-hosting device for facilitating efficient name encryption in a content centric network, in accordance with an embodiment of the present invention. During operation, the system receives, by a content-hosting device, an interest with a name that is an HSVLI, wherein a random nonce is appended to the interest name (operation 602). The content-hosting device determines whether it can return a content object based on the interest name (decision 604). For example, if the device can serve content under the prefix "/a/b/c" and if the interest name is "/a/b/c/<nonce>," the device can determine that it can serve content under the prefix "/a/b/c" but that the content object with the name of "/a/b/c/<nonce>" does not exist. The device can generate a first content object which indicates a positive response (e.g., "does not exist" or "DNE") (operation 606).

The device can transmit the first content object (operation 608). The device can subsequently receive a second interest with a name that includes one or more encrypted name components (operation 612). The device can decrypt the encrypted name components of the second interest name (operation 612). The device can generate or obtain a second content object corresponding to the decrypted second interest name (operation 614). The device can replace the decrypted second interest name with the partially encrypted second interest name in the second content object (not shown), and transmit the second content object (operation 616).

If the content-hosting device determines that it cannot return a content object based on the interest name (decision 604), the device generates a first content object which indicates a negative acknowledgement ("NACK") (operation 620). The device then transmits the first content object (operation 622).

Exemplary Computer Systems

Figure 7:
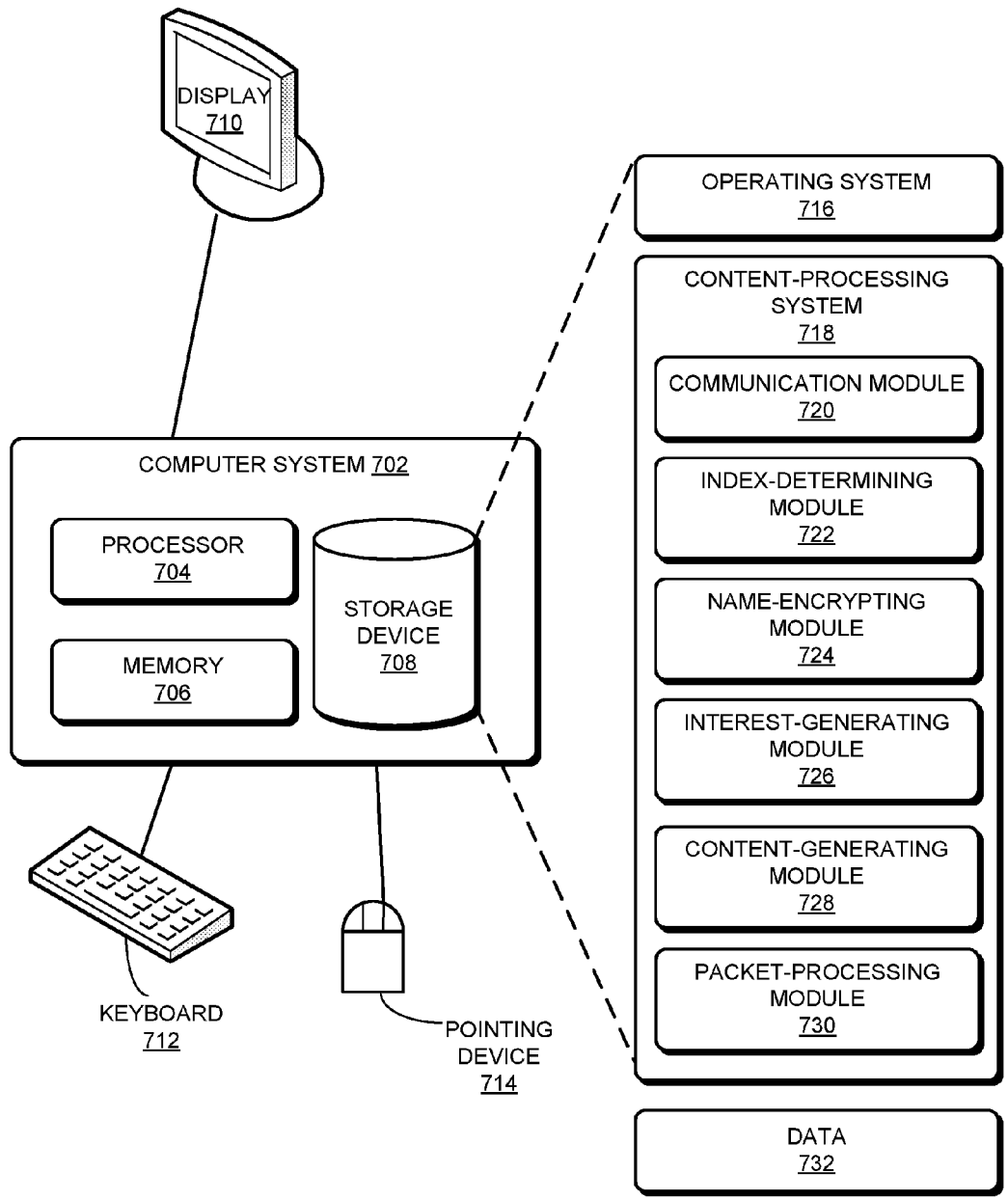
FIG. 7 illustrates an exemplary computer system that facilitates efficient name encryption in a content centric network, in accordance with an embodiment of the present invention.

FIG. 7 illustrates an exemplary computer system that facilitates efficient name encryption in a content centric network, in accordance with an embodiment of the present invention. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 730.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network, such as a content centric network (communication module 720). A data packet can include an interest packet or a content object packet with a name which is an HSVLI that includes contiguous name components ordered from a most general level to a most specific level, and the name can include a random nonce appended to the end of the name (e.g., as a last name component).

Further, content-processing system 718 can include instructions for determining an index for a name of an interest, wherein the index indicates a minimum number of the contiguous name components beginning from the most general level that represent a minimum routable prefix needed to route the interest to a content producing device that can satisfy the interest (index-determining module 722). Content-processing system 718 can include instructions for encrypting one or more name components of the interest name beginning with the name component immediately following the minimum routable prefix (name-encrypting module 724). Content-processing system 718 can include instructions for transmitting the interest based on the encrypted name (communication module 720).

Content-processing system 718 can also include instructions for generating a first probing interest with a name that comprises one or more contiguous name components of the interest name beginning from the most general level (interest-generating module 726). Content-processing system 718 can also include instructions for, in response to receiving a first content object which indicates a positive response of the first probing interest (communication module 720), setting the index to a number of name components in the first probing interest name (index-determining module 722). Content-processing system 718 can also include instructions for, in response to receiving a second content object which indicates a negative acknowledgment of the first probing interest (communication module 720), generating a second probing interest with a name that comprises the first probing interest name followed by a next contiguous name component of the interest name (interest-generating module 726).

Content-processing system 718 can also include instructions for determining a midpoint index of a number of name components in the interest name (index-determining module 722). Content-processing system 718 can also include instructions for generating a first probing interest with a name that comprises one or more contiguous name components of the interest name beginning from the most general level name component to the name component corresponding to the midpoint index (interest-generating module 726). Content-processing system 718 can also include instructions for, in response to receiving a first content object which indicates a positive response of the first probing interest (communication module 720), setting the index to a number of name components in the first probing interest name (index-determining module 722).

Content-processing system 718 can also include instructions for determining a lower midpoint index of a lower portion of the interest name (index-determining module 722). Content-processing system 718 can also include instructions for generating a second probing interest with a name that comprises one or more contiguous name components of the interest name beginning from the most general level name component to a name component corresponding to the lower midpoint index. Content-processing system 718 can also include instructions for, in response to receiving a third content object which indicates a negative acknowledgment of the first probing interest (communication module 728), determining an upper midpoint index of the upper portion (index-determining module 722) and generating a third probing interest with a name that comprises one or more contiguous name components of the interest name beginning from the most general level name component to a name component corresponding to the upper midpoint index (interest-generating module 726).

Content-processing system 718 can also include instructions for generating an initial interest for the index, wherein the initial interest is transmitted to a third party service and has a payload that includes the interest name and a public key of the third party service (interest-generating module 726). Content-processing system 718 can also include instructions for, in response to the initial interest, receiving an initial content object that has a payload that indicates the index, wherein the payload of the initial content object is encrypted based on the public key of the third party service (communication module 720).

Content-processing system 718 can also include instructions for receiving a first interest with a name that is an HSVLI, wherein a random nonce is appended to the first interest name (communication module 720). Content-processing system 718 can include instructions for, in response to determining that the system can return a content object based on the first interest name (packet-processing module 730), generating a first content object which indicates a positive response (content-generating module 728). Content-processing system 718 can also include instructions for, in response to determining that the content-hosting device cannot return a content object based on the first interest name (packet-processing module 730), generating a second content object which indicates a negative acknowledgment of the first interest (content-generating module 728).

Data 732 can include any data that is required as input or that is generated as output by the methods and/or processes described in this disclosure. Specifically, data 732 can store at least: an interest or a content object packet; a name; a name that is an HSVLI that includes contiguous name components ordered from a most general level to a most specific level; an index that corresponds to a position of a name component in the HSVLI; an index which is a split index that indicates a minimum routable prefix; a routable prefix; one or more encrypted name components; a probing interest with a random nonce appended as a last name component; an indicator of a positive response; an indicator of a negative response or acknowledgment ("NACK"); a key identifier of a content object; a public key or associated key identifier of a consumer, a third party service, or a content-hosting or content-producing device; a midpoint index which is an index corresponding to a midpoint of a total number of name components in an interest name; a lower portion of an interest name which includes name components from the most general level name component to the name component preceding the name component corresponding to the midpoint index; an upper portion of an interest name which includes name components from the name component following the name component corresponding to the midpoint index to the most specific level name component; a lower midpoint index of the lower portion; an upper midpoint index of the upper portion; and an indicator of a number of collapsed name prefixes in a forwarding information base.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating efficient name encryption, the system comprising:
a processor; and
a storage device storing instructions that when executed by the processor cause the processor to perform a method, the method comprising:
determining, by a client computing device, an index for a name of an interest, wherein the name is a hierarchically structured variable length identifier that includes a plurality of contiguous name components ordered from a most general level to a most specific level, wherein the index indicates a minimum number of name components of the plurality of contiguous name components beginning from the most general level that represent a minimum routable prefix needed to route the interest to a content producing device that can satisfy the interest;
encrypting one or more name components of the plurality of contiguous name components beginning with a first name component that immediately follows the minimum routable prefix to generate an encrypted name of the interest; and
transmitting the interest based on the encrypted name, thereby facilitating efficient name encryption in a content centric network.

19

2. The computer system of claim 1, wherein determining the index comprises:
generating a first probing interest with a name that comprises one or more contiguous name components of the interest name beginning from the most general level;
in response to receiving a first content object which indicates a positive response of the first probing interest, setting the index to a number of name components in the first probing interest name; and
in response to receiving a second content object which indicates a negative acknowledgment of the first probing interest, generating a second probing interest with a name that comprises the first probing interest name followed by a next contiguous name component of the interest name.

3. The computer system of claim 2, wherein the method further comprises determining that the first content object indicates a positive response of the first probing interest, which comprises:
determining that the first content object indicates that a receiving content producing device can return a content object based on the name components of the interest name as included in the first probing interest name; and
determining that a key identifier of the first content object matches a public key of the content producing device.

4. The computer system of claim 2, wherein the method further comprises:
appending a first random nonce to the first probing interest name; and
appending a second random nonce to the second probing interest name.

5. The computer system of claim 1, wherein determining the index further comprises:
determining a midpoint index of a number of name components in the interest name, wherein a lower portion of the interest name includes the name components from the most general level name component to the name component preceding the name component corresponding to the midpoint index, and wherein an upper portion of the interest name includes the name components from the name component following the name component corresponding to the midpoint index to the most specific level name component;
generating a first probing interest with a name that comprises one or more contiguous name components of the interest name beginning from the most general level name component to the name component corresponding to the midpoint index; and
in response to receiving a first content object which indicates a positive response of the first probing interest, setting the index to a number of name components in the first probing interest name.

6. The computer system of claim 5, wherein determining the index further comprises:
in response to receiving a second content object which indicates that a receiving content producing device can return a content object based on the name components of the interest name as included in the first probing interest, and in response to determining that a key identifier of the second content object is associated with a public key of the content producing device:
determining a lower midpoint index of the lower portion; and
generating a second probing interest with a name that comprises one or more contiguous name components of the interest name beginning from the most general level name component to a name component corresponding to the lower midpoint index; and
in response to receiving a third content object which indicates a negative acknowledgment of the first probing interest:
determining an upper midpoint index of the upper portion; and
generating a third probing interest with a name that comprises one or more contiguous name components of the interest name beginning from the most general level name component to a name component corresponding to the upper midpoint index.

7. The computer system of claim 5, wherein the method further comprises:
appending a first random nonce to the first probing interest name;
appending a second random nonce to the second probing interest name; and;
appending a third random nonce to the third probing interest name.

8. The computer system of claim 1, wherein determining the index further comprises generating one or more probing interests based on a number of number components for the interest name and further based on one or more of:
a linear search;
a binary search; and
a number of collapsed name prefixes in a forwarding information base, wherein a collapsed name prefix indicates a plurality of name components with a same forwarding information in the forwarding information base.

9. The computer system of claim 1, wherein determining the index further comprises:
generating an initial interest for the index, wherein the initial interest is transmitted to a third party service and has a payload that includes the interest name and a public key of the third party service, wherein the payload of the initial interest is encrypted based on a public key of the client computing device, wherein the initial interest indicates the public key of the client computing device; and
in response to the initial interest, receiving an initial content object that has a payload that indicates the index, wherein the payload of the initial content object is encrypted based on the public key of the third party service.

10. The computer system of claim 1, wherein the interest name includes one or more nested and encrypted names suffixes, wherein a name suffix comprises one or more contiguous name components of the interest name, and wherein the method further comprises:
determining a second index for a nested and encrypted name suffix, wherein the second index indicates a minimum number of contiguous name components beginning from the most general level that represent a minimum routable prefix needed to route the interest to a content producing device that can satisfy a nested interest with a name which includes the nested and encrypted name suffix; and
encrypting the name components following the name components corresponding to the second index.

11. A computer-implemented method for facilitating efficient name encryption, the method comprising:
determining, by a client computing device, an index for a name of an interest, wherein the name is a hierarchically structured variable length identifier that includes a plurality of contiguous name components ordered from a most general level to a most specific level, wherein the index indicates a minimum number of name components of the plurality of contiguous name components beginning from the most general level that represent a minimum routable prefix needed to route the interest to a content producing device that can satisfy the interest;

encrypting one or more name components of the plurality of contiguous name components beginning with a first name component that immediately follows the minimum routable prefix to generate an encrypted name of the interest; and transmitting the interest based on the encrypted name, thereby facilitating efficient name encryption in a content centric network.

12. The method of claim 11, wherein determining the index comprises:

generating a first probing interest with a name that comprises one or more contiguous name components of the interest name beginning from the most general level;

in response to receiving a first content object which indicates a positive response of the first probing interest, setting the index to a number of name components in the first probing interest name;

in response to receiving a second content object which indicates a negative acknowledgment of the first probing interest, generating a second probing interest with a name that comprises the first probing interest name followed by a next contiguous name component of the interest name;

appending a first random nonce to the first probing interest name; and appending a second random nonce to the second probing interest name.

13. The method of claim 12, further comprising determining that the first content object indicates a positive response of the first probing interest, which comprises:

determining that the first content object indicates that a receiving content producing device can return a content object based on the name components of the interest name as included in the first probing interest name; and determining that a key identifier of the first content object matches a public key of the content producing device.

14. The method of claim 1, wherein determining the index further comprises:

determining a midpoint index of a number of name components in the interest name, wherein a lower portion of the interest name includes the name components from the most general level name component to the name component preceding the name component corresponding to the midpoint index, and wherein an upper portion of the interest name includes the name components from the name component following the name component corresponding to the midpoint index to the most specific level name component;

generating a first probing interest with a name that comprises one or more contiguous name components of the interest name beginning from the most general level name component to the name component corresponding to the midpoint index; and in response to receiving a first content object which indicates a positive response of the first probing interest, setting the index to a number of name components in the first probing interest name.

15. The method of claim 14, wherein determining the index further comprises:

in response to receiving a second content object which indicates that a receiving content producing device can return a content object based on the name components of the interest name as included in the first probing interest, and in response to determining that a key identifier of the second content object is associated with a public key of the content producing device:

determining a lower midpoint index of the lower portion; and generating a second probing interest with a name that comprises one or more contiguous name components of the interest name beginning from the most general level name component to a name component corresponding to the lower midpoint index;

in response to receiving a third content object which indicates a negative acknowledgment of the first probing interest:

determining an upper midpoint index of the upper portion; and generating a third probing interest with a name that comprises one or more contiguous name components of the interest name beginning from the most general level name component to a name component corresponding to the upper midpoint index;

appending a first random nonce to the first probing interest name;

appending a second random nonce to the second probing interest name; and;

appending a third random nonce to the third probing interest name.

16. The method of claim 11, wherein determining the index further comprises generating one or more probing interests based on a number of number components for the interest name and further based on one or more of:

a linear search;

a binary search; and a number of collapsed name prefixes in a forwarding information base, wherein a collapsed name prefix indicates a plurality of name components with a same forwarding information in the forwarding information base.

17. The method of claim 11, wherein determining the index further comprises:

generating an initial interest for the index, wherein the initial interest is transmitted to a third party service and has a payload that includes the interest name and a public key of the third party service, wherein the payload of the initial interest is encrypted based on a public key of the client computing device, wherein the initial interest indicates the public key of the client computing device; and in response to the initial interest, receiving an initial content object that has a payload that indicates the index, wherein the payload of the initial content object is encrypted based on the public key of the third party service.

18. The method of claim 11, wherein the interest name includes one or more nested and encrypted names suffixes, wherein a name suffix comprises one or more contiguous name components of the interest name, and wherein the method further comprises:

determining a second index for a nested and encrypted name suffix, wherein the second index indicates a minimum number of contiguous name components beginning from the most general level that represent a minimum routable prefix needed to route the interest to a content producing device that can satisfy a nested interest with a name which includes the nested and encrypted name suffix; and encrypting the name components following the name components corresponding to the second index.

19. A computer system for facilitating efficient content exchange, the system comprising:

a processor; and a storage device storing instructions that when executed by the processor cause the processor to perform a method, the method comprising:

receiving, by a content-hosting device, a first interest with a name that is a hierarchically structured variable length identifier that includes contiguous name components ordered from a most general level to a most specific level, the name of the first interest including a minimum routable prefix needed to route the first interest to the content-hosting device that can satisfy the first interest, and wherein a random nonce is appended to the first interest name immediately following the minimum routable prefix;

in response to determining that the content-hosting device can return a content object based on the first interest name, generating a first content object which indicates a positive response; and in response to determining that the content-hosting device cannot return a content object based on the first interest name, generating a second content object which indicates a negative acknowledgment of the first interest.

20. The computer system of claim 19, wherein the method further comprises:

receiving a second interest with a partially encrypted name that includes one or more encrypted name components;

decrypting the partially encrypted name for the second interest;

determining a second content object corresponding to the decrypted name for the second interest;

replacing, in the second content object, the decrypted name for the second interest with the partially encrypted name for the second interest; and transmitting the second content object.

* * * * *